United States Patent
Simon

(10) Patent No.: US 11,640,229 B2
(45) Date of Patent: May 2, 2023

(54) CONTROL MENU FOR NAVIGATING PARENT VIEW CONTENT

(71) Applicant: SAP SE, Walldorf (DE)

(72) Inventor: Patrick Simon, Beckingen (DE)

(73) Assignee: SAP SE, Walldorf (DE)

(*) Notice: Subject to any disclaimer, the term of this patent is extended or adjusted under 35 U.S.C. 154(b) by 128 days.

(21) Appl. No.: 17/385,191

(22) Filed: Jul. 26, 2021

(65) Prior Publication Data

US 2023/0028333 A1    Jan. 26, 2023

(51) Int. Cl.
*G06F 3/0482* (2013.01)
*G06F 16/16* (2019.01)
*G06F 3/0485* (2022.01)

(52) U.S. Cl.
CPC .......... *G06F 3/0482* (2013.01); *G06F 3/0485* (2013.01); *G06F 16/168* (2019.01)

(58) Field of Classification Search
CPC ..... G06F 3/0482; G06F 16/168; G06F 3/0485
See application file for complete search history.

(56) References Cited

U.S. PATENT DOCUMENTS

| | | | | |
|---|---|---|---|---|
| 2012/0254801 | A1* | 10/2012 | Gaffney | G06F 8/38 715/825 |
| 2015/0052459 | A1* | 2/2015 | Sunil | G06F 9/451 715/760 |
| 2017/0068400 | A1* | 3/2017 | Chiba | G06F 3/0482 |
| 2020/0285376 | A1* | 9/2020 | Sidman | G06F 3/0482 |

* cited by examiner

*Primary Examiner* — Anil K Bhargava
(74) *Attorney, Agent, or Firm* — Buckley, Maschoff & Talwalkar LLC

(57) ABSTRACT

Provided is a system and method for generating a control menu in a child page of a software application which can control selections of records in a parent page from which the child page depends. In one example, the method may include navigating a display window from a parent view of a plurality of data records to a child view that includes details of a first data record in response to selection of the first data record via the parent view, displaying a control menu within the child view which comprises a plurality of values of a target data attribute for the plurality of data records, respectively, detecting, via the control menu, a selection of a value of a target data attribute of a second data record, and removing the details of the first data record and instantiating details of the second data record, in response.

17 Claims, 16 Drawing Sheets

FIG. 2A

Orders (15)

| Order ID | Order Date | Customer | Shipped | Status |
|---|---|---|---|---|
| 7991 | 11/21/2020 | Restaurant B | 11/26/2020 | Success |
| 7918 | 11/20/2020 | Coffee House F | 11/27/2020 | In Process |
| 7775 | 11/08/2020 | Restaurant D | 11/21/2020 | Error(s) |
| 7811 | 11/10/2020 | Caterer A | 11/15/2020 | Success |
| 8004 | 11/22/2020 | Restaurant G | 11/26/2020 | Success |
| 7858 | 11/13/2020 | Kiosk BB | 11/18/2020 | Success |
| 7537 | 11/03/2020 | Soup Stand 7 | 11/14/2020 | Error(s) |
| 7846 | 11/13/2020 | Restaurant C | 11/16/2020 | Success |
| 8095 | 11/24/2020 | Sandwich Shop | 11/30/2021 | In Process |
| ... | ... | ... | ... | ... |
| ... | ... | ... | ... | ... |

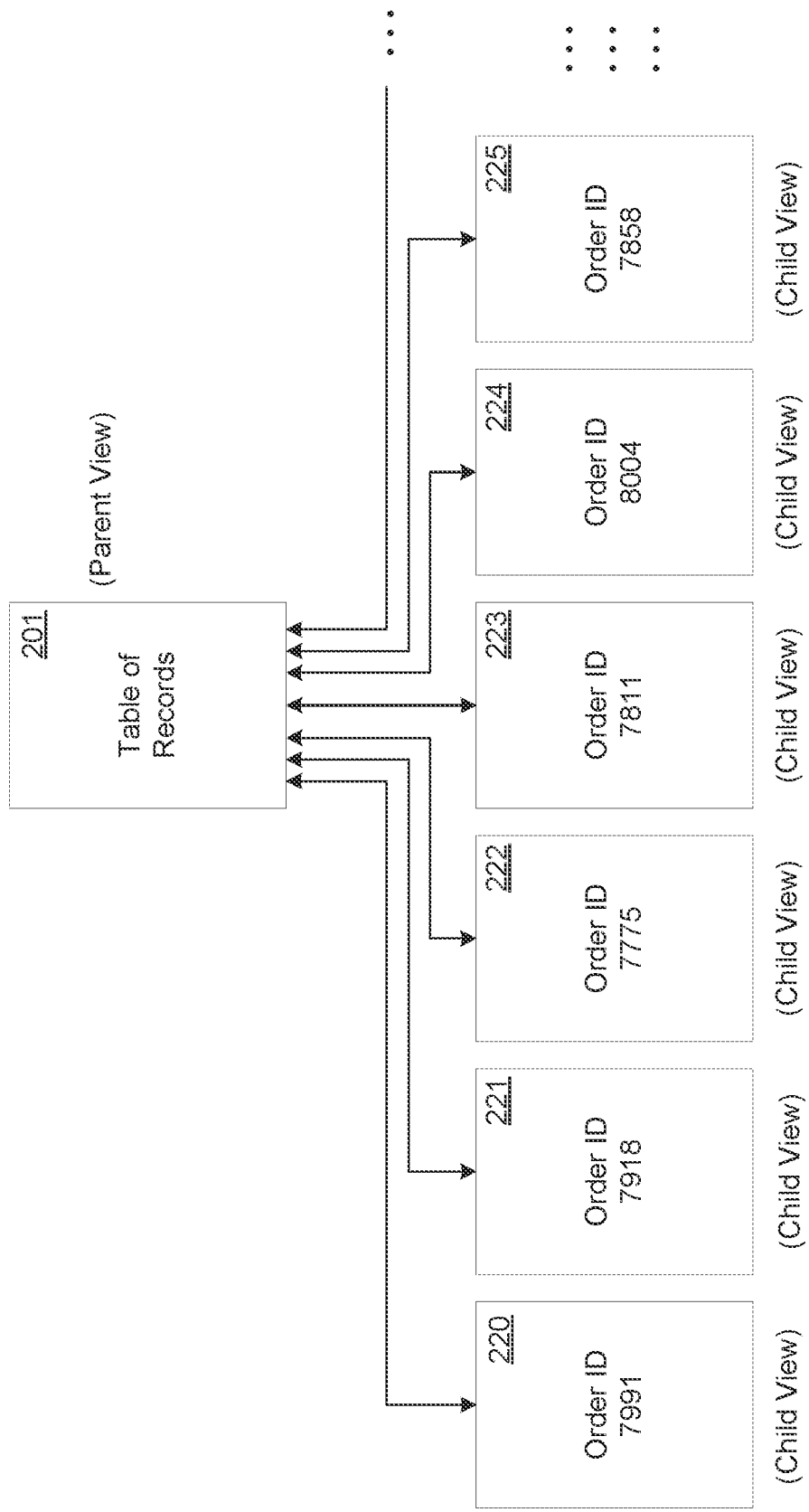

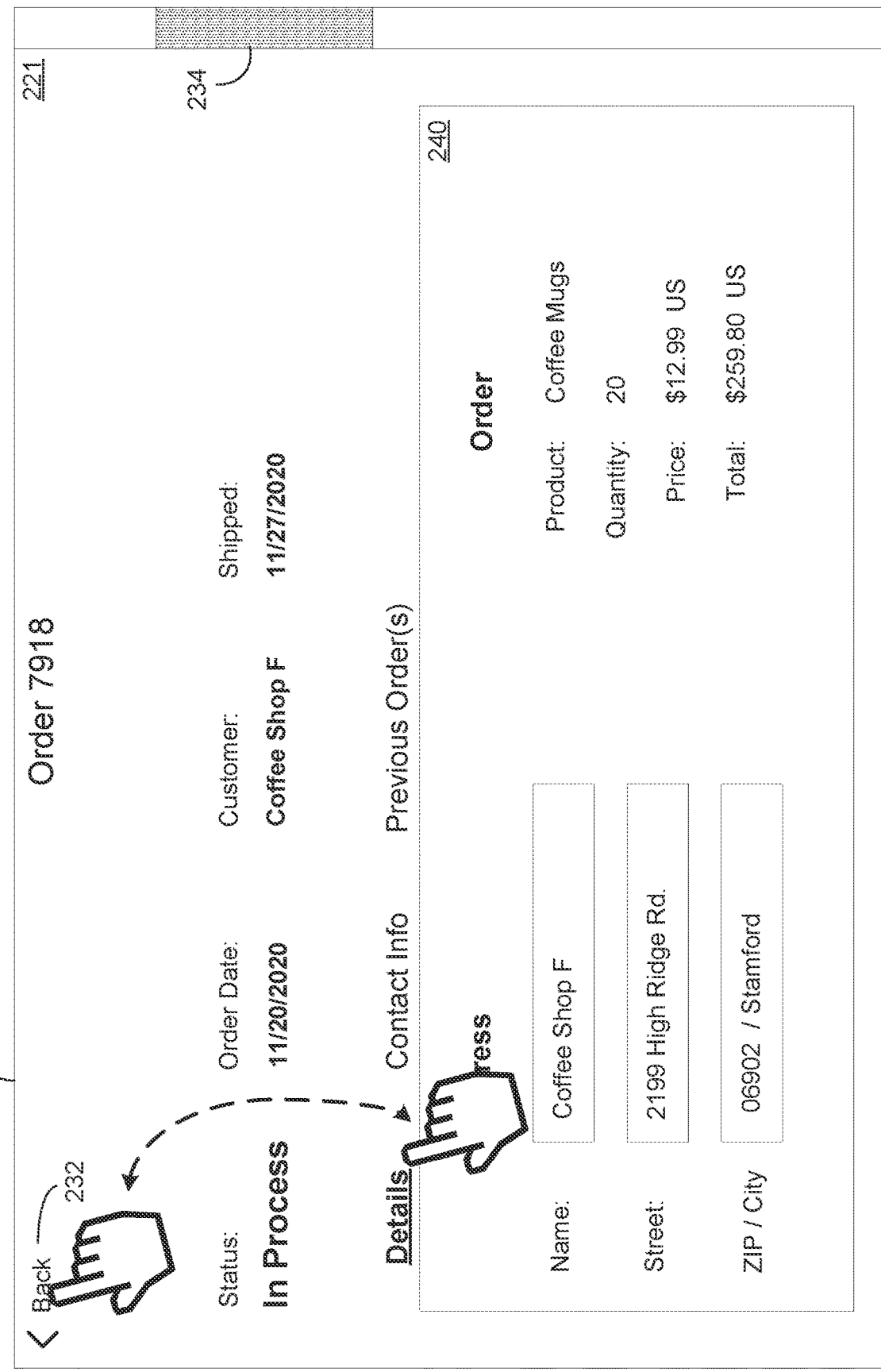

FIG. 3A

Orders (15)

| Order ID | Order Date | Customer | Shipped | Status |
|---|---|---|---|---|
| 7991 | 11/21/2020 | Restaurant B | 11/26/2020 | Success |
| 7918 | 11/20/2020 | Coffee House F | 11/27/2020 | In Process |
| 7775 | 11/08/2020 | Restaurant D | 11/21/2020 | Error(s) |
| 7811 | 11/10/2020 | Caterer A | 11/15/2020 | Success |
| 8004 | 11/22/2020 | Restaurant G | 11/26/2020 | Success |
| 7858 | 11/13/2020 | Kiosk BB | 11/18/2020 | Success |
| 7537 | 11/03/2020 | Soup Stand 7 | 11/14/2020 | Error(s) |
| 7846 | 11/13/2020 | Restaurant C | 11/16/2020 | Success |
| 8095 | 11/24/2020 | Sandwich Shop | 11/30/2021 | In Process |
| ... | ... | ... | ... | ... |

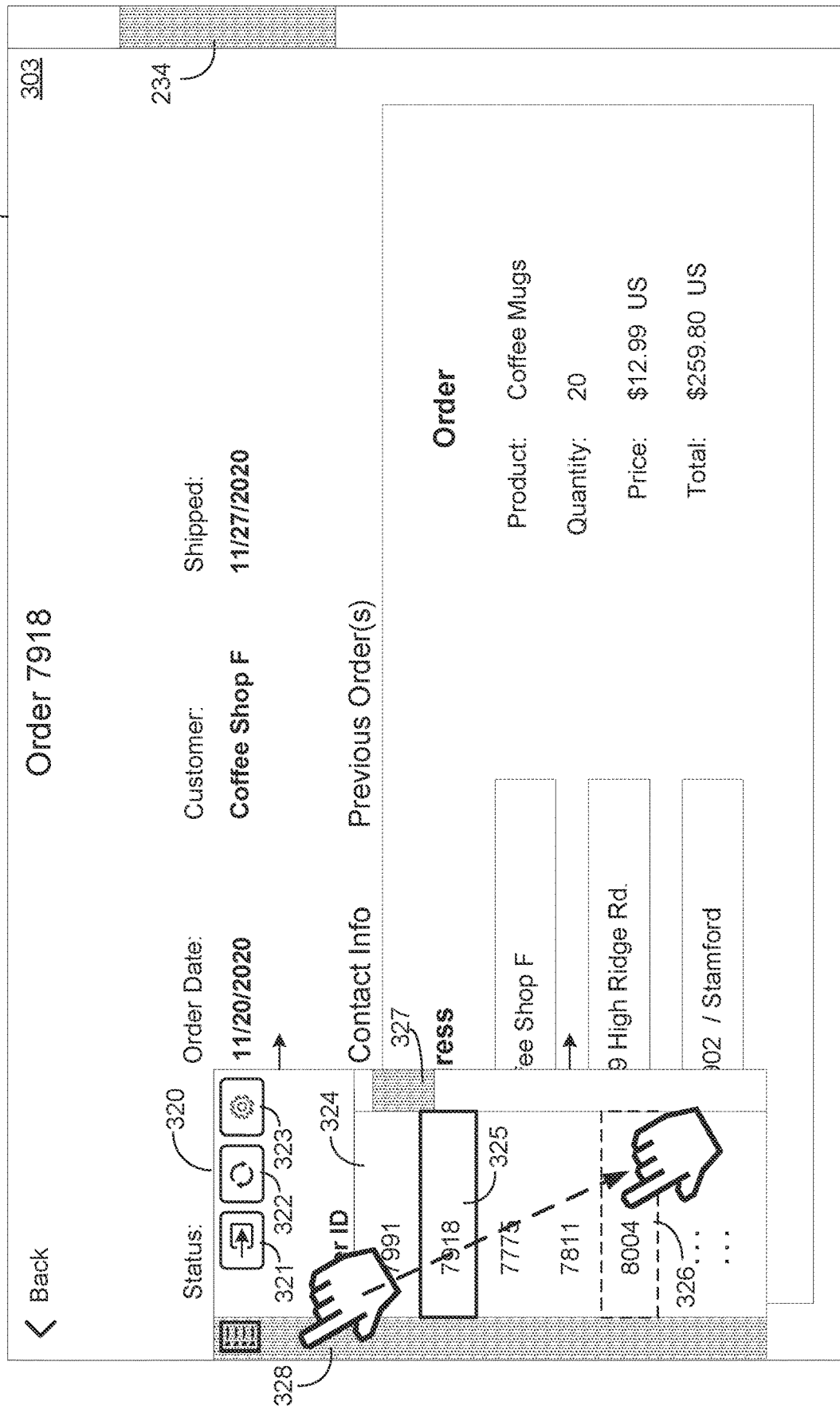

FIG. 3D

Back

Status: Success

Order 8004

Order Date: 11/22/2020
Customer: Restaurant G
Shipped: 11/26/2020

Details  Contact Info  Previous Order(s)

Address

Name: Restaurant G
Street: 774 Salad St.
ZIP / City: 06903 / Stamford

Order

Product: Romaine / Case
Quantity: 4
Price: $32.00 US
Total: $128.00 US

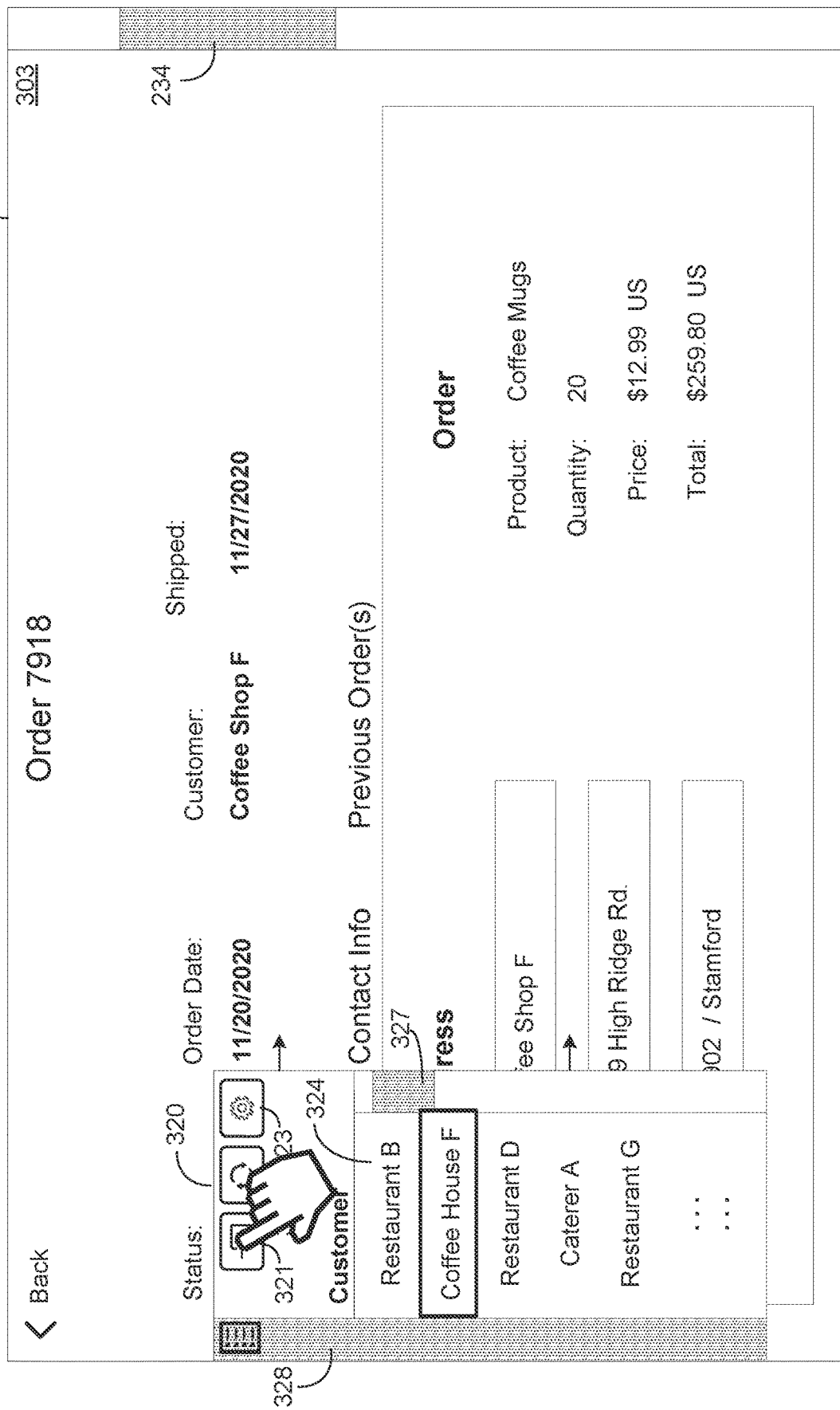

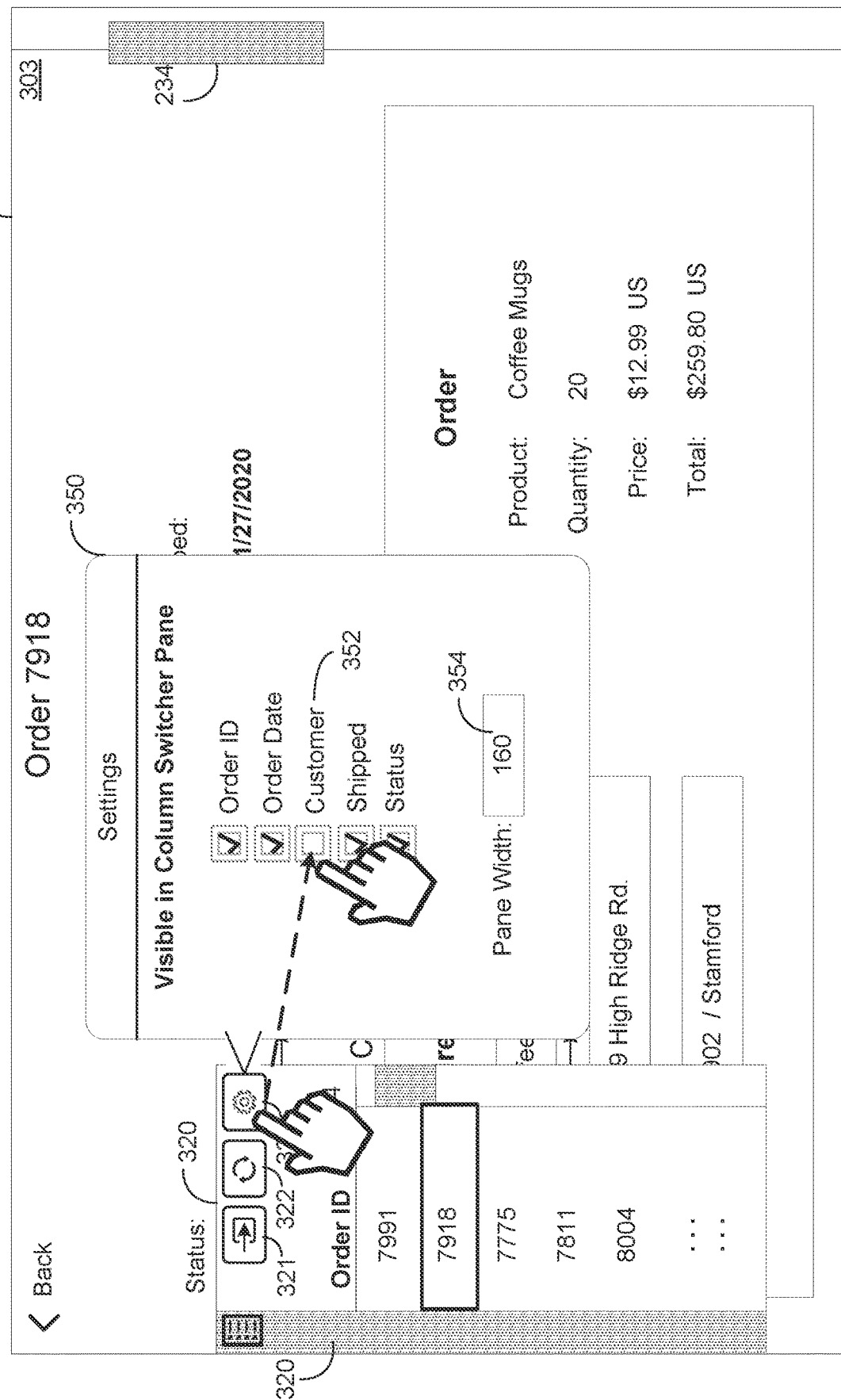

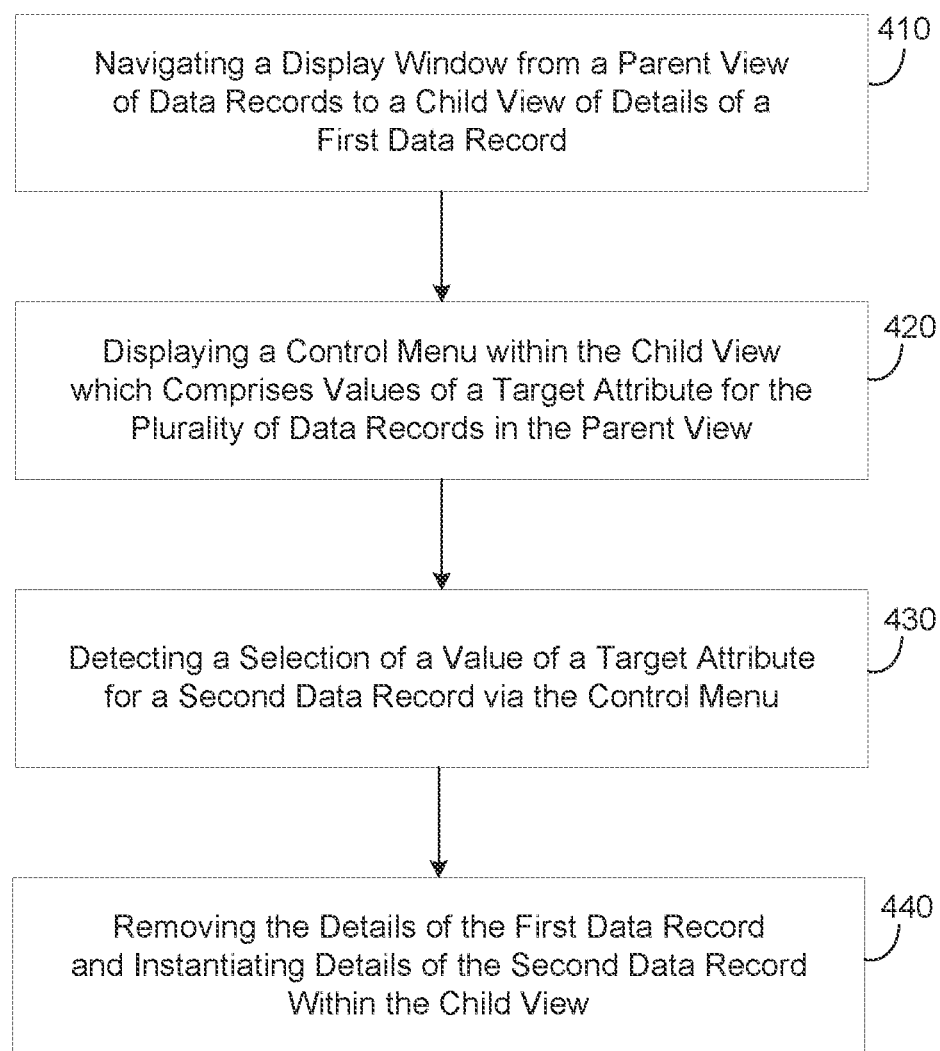

CONTROL MENU FOR NAVIGATING PARENT VIEW CONTENT

BACKGROUND

Software applications may display a view of multiple records at once in a tabular format. For example, a user interface may be provided which includes rows and columns of data. In this view, each of the records may be drilled-into by selecting a button or a link corresponding to the respective record. When a user desires to drill down into another record, the user must backtrack the route they took to drill-down into the respective record until they get back to the original view of the multiple records. Once back, the user can now drill-down into a different record. For various types of users, such as a settlement clerk, this process may be repeated many times a day while the user updates a number of different records. Each time the process is repeated, valuable time is consumed going back to the original view and drilling-down into the next record.

BRIEF DESCRIPTION OF THE DRAWINGS

Features and advantages of the example embodiments, and the manner in which the same are accomplished, will become more readily apparent with reference to the following detailed description taken in conjunction with the accompanying drawings.

FIG. 2A is a diagram illustrating a view within a display window that includes a table of records in accordance with example embodiments.

FIG. 2B is a diagram illustrating navigation routes within a software application including the table of records in accordance with an example embodiment.

FIG. 2C is a diagram illustrating a view of details of a data record from the table in the parent view of FIG. 2A that has been drilled-down into via a predefined navigation route of the software application in accordance with example embodiments.

FIGS. 3A-3J are diagrams illustrating various operations of a user interacting with a parent view and a child view which includes a control menu for the parent view in accordance with various example embodiments.

FIG. 4 is a diagram illustrating a method of providing a control menu within a child view for navigating records in a parent view in accordance with an example embodiment.

Figure 1:
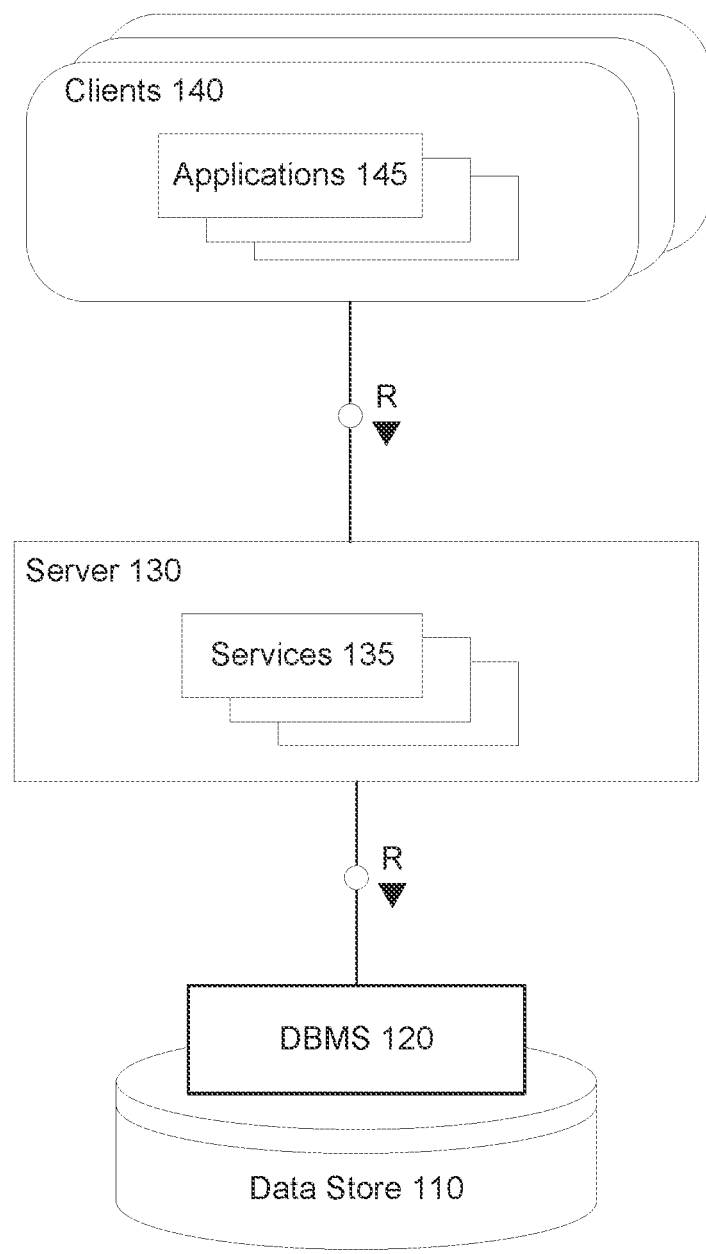
FIG. 1 is a diagram illustrating an architecture of a database in accordance with an example embodiment.

Throughout the drawings and the detailed description, unless otherwise described, the same drawing reference numerals will be understood to refer to the same elements, features, and structures. The relative size and depiction of these elements may be exaggerated or adjusted for clarity, illustration, and/or convenience.

DETAILED DESCRIPTION

In the following description, specific details are set forth in order to provide a thorough understanding of the various example embodiments. It should be appreciated that various modifications to the embodiments will be readily apparent to those skilled in the art, and the generic principles defined herein may be applied to other embodiments and applications without departing from the spirit and scope of the disclosure. Moreover, in the following description, numerous details are set forth for the purpose of explanation. However, one of ordinary skill in the art should understand that embodiments may be practiced without the use of these specific details. In other instances, well-known structures and processes are not shown or described in order not to obscure the description with unnecessary detail. Thus, the present disclosure is not intended to be limited to the embodiments shown but is to be accorded the widest scope consistent with the principles and features disclosed herein.

Software applications often provide functions or processes that are time consuming for a user to execute. As a non-limiting example, a user may be required to verify various shipping activities. Each item may have its own details page that the user may need to interact with to update shipping information, payment information, verify status, confirm receipt, and the like. To perform such a verification, the software application may provide a user interface that displays a list of data records, etc. with high-level details of the shipped items. For example, the list of data records may be provided within a first page, or parent view. From this parent view, the user can navigate or otherwise drill-down into the details of each of the data records by selecting the data records within the parent view. In response, the software application may page forward within the application to a next page of the software application with the selected data record where more details can be viewed. When the user is done with the selected data record, the user may go back (i.e., select the back button within a display window of the software application) to return to the parent view. Here, the user can then select a next data record for viewing and managing.

For various activities, such as a settlement clerk, this process may need to be performed dozens, hundreds, or even thousands of times a day. Each of these "page routes" consists of several pages that must be processed individually and sequentially beginning with the parent view/page which includes an overview of all of the data records and child views which branch off from the parent view and which provide additional details of the different data records. When a user is finished manipulating a first data record (i.e., the drilled-down details within a child page/view), the user must go back to the parent view where the other data records are visible, and select a next data record from the list. This enables the user to now drill-down into the next data record. Each time the user hits the back button and then drills-down into a next data record consumes page requests and processing resources. This also slows down the user significantly because the user must traverse a number of unnecessary pages in order to get to the page that the user desires to manage.

The example embodiments are directed to a control menu that can be integrated within a child view (or within a display window that displays the child view) and which enables the user to drill-down into details of other data records without having to go back to the parent view. Instead, the control menu includes links, options, buttons, etc. for navigating the child view to details of a different data record. Here, the control menu uses values of a target data attribute for the plurality of data records shown in the parent view as navigation buttons for quickly navigating to the details of the plurality of data records, from an already drilled-down data record. Accordingly, tasks performed via the user interface/display window can be performed with significantly less page requests, clicks, etc. thereby saving both processing resources and time for the user.

The parent view may include a toggle button, etc. which can be used to activate the control menu within the child view. By selecting the activation button (toggle) within the parent view, the application automatically populates a next page (child view) with the control menu. When the user selects a data record within the parent view, the application may navigate to the details of the data record and also display the control menu (or a visual identifier of the control menu). For example, the visual identifier may be displayed on a side of the display window opposite of the scroll bar of the window. When the user brings their cursor, pointer, finger, etc., within proximity of the visual identifier, the control menu may pop-out or otherwise instantiate and provide a list of values (e.g., of the plurality of data records) which can be selected to quickly navigate to any of the plurality of data records. If the user clicks on a value corresponding to a different data record than currently shown in the child view, the application may remove the details of the currently selected data record within the child view and replace it with the details of the different data record without requiring the user to go back to the parent view.

For example, the control menu may be located at the margin of the left side of the display window. The appearance is similar to an ordinary menu bar. Visually it may be represented as a selectable bar with a "control menu" icon embedded therein. Just like a menu bar, the selectable bar may have a mouse sensitive area. After the user has touched this area with the mouse, the control menu pane appears containing a list with the entries of target data attributes of the plurality of data records. The pane contains either all table list entries of a column from the parent view or only those on which the user has filtered. If the user clicks on a list entry in the control menu, the corresponding page is navigated to.

Some of the benefits of the control menu include saving time for a user that previously required a significant amount of "back button" clicks. Furthermore, less page requests are needed to be processed. This enables the user to work much faster and through the entries of the data records in any order desired. Furthermore, the control menu enables only certain table columns (data attributes) to be used as identifiers in the control menu. Furthermore, because only one page is edited at a time and the list of data records does not have to be loaded each time after a "back button" selection, the control menu conserves processing resources and the user interface does not flicker back and forth due to page loading.

FIG. 1 illustrates a system architecture of a database 100 in accordance with an example embodiment. It should be appreciated that the embodiments are not limited to architecture shown in FIG. A or to a database architecture, however, FIG. A is shown for purposes of example. The application including the control menu described herein may access data from the database 100. For example, the database 100 may include or interact with database records which include a plurality of data attributes and which are visually output via a user interface in tabular format. The user viewing such a user interface may simultaneously view multiple data records at once. Furthermore, once the user has drilled-down into a record, the user can quickly navigate to another record without the need to go back to a parent screen.

Referring to FIG. 1, the database 100 includes a data store 110, a database management system (DBMS) 120, a server 130, services 135, clients 140, and applications 145. Generally, services 135 executing within the server 130 receive requests from applications 145 executing on clients 140 and provides results to the applications 145 based on data stored within data store 110. For example, the server 130 may execute and provide services 135 to applications 145. Services 135 may comprise server-side executable program code (e.g., compiled code, scripts, etc.) which provide functionality to applications 145 by providing user interfaces to clients 140, receiving requests from applications 145 (e.g., drag-and-drop operations), retrieving data from data store 110 based on the requests, processing the data received from data store 110, and providing the processed data to applications 145.

In one non-limiting example, a client 140 may execute one or more of the applications 145 to perform visual analysis via a user interface displayed on the client 140 to view analytical information such as charts, graphs, tables, and the like, based on the underlying data stored in the data store 110. The applications 145 may pass analytic information to one of services 135 based on input received via the client 140. A structured query language (SQL) query may be generated based on the request and forwarded to DBMS 120. DBMS 120 may execute the SQL query to return a result set based on data of data store 110, and the applications 145 may create a report/visualization based on the result set. In this example, DBMS 120 may perform a query optimization on the SQL query to determine a most optimal alternative query execution plan.

Raw data from various sources may be stored in the data store 110. In this example, the applications 145 and/or the services 135 may extract core features from the raw data and also derive features from the core features. The features may be stored as database tables within the data store 110. For example, a feature may be assigned to its own table with one or more columns of data. In one example, the features may be observed as numerical values.

The services 135 executing on the server 130 may communicate with DBMS 120 using database management interfaces such as, but not limited to, Open Database Connectivity (ODBC) and Java Database Connectivity (JDBC) interfaces. These types of services 135 may use SQL and SQL script to manage and query data stored in data store 110. The DBMS 120 serves requests to query, retrieve, create, modify (update), and/or delete data from database files stored in data store 110, and also performs administrative and management functions. Such functions may include snapshot and backup management, indexing, optimization, garbage collection, and/or any other database functions that are or become known.

Server 130 may be separated from or closely integrated with DBMS 120. The server 130 may be closely-integrated and enable execution of services 135 completely on the database 100, without the need for an additional server. For example, server 130 may provide a comprehensive set of embedded services which provide end-to-end support for Web-based applications. The services 135 may include a lightweight web server, configurable support for Open Data Protocol, server-side JavaScript execution and access to SQL and SQLScript. Server 130 may provide application services (e.g., via functional libraries) using services 135 that manage and query the database files stored in the data store 110. The application services can be used to expose the database data model, with its tables, views and database procedures, to clients 140. In addition to exposing the data model, server 130 may host system services such as a search service, and the like.

Data store 110 may be any query-responsive data source or sources that are or become known, including but not limited to a SQL relational database management system.

Data store 110 may include or otherwise be associated with a relational database, a multi-dimensional database, an Extensible Markup Language (XML) document, or any other data storage system that stores structured and/or unstructured data. The data of data store 110 may be distributed among several relational databases, dimensional databases, and/or other data sources. Embodiments are not limited to any number or types of data sources.

In some embodiments, the data of data store 110 may include files having one or more of conventional tabular data, row-based data, column-based data, object-based data, and the like. Moreover, the data may be indexed and/or selectively replicated in an index to allow fast searching and retrieval thereof. Data store 110 may support multi-tenancy to separately support multiple unrelated clients by providing multiple logical database systems which are programmatically isolated from one another. Furthermore, data store 110 may support multiple users that are associated with the same client and that share access to common database files stored in the data store 110.

Data items (e.g., data records, data entries, etc.) may be stored, modified, deleted, and the like, within the data store 110. As an example, data items may be created, written, modified, or deleted based on instructions from any of the applications 145, the services 135, and the like. Each data item may be assigned a globally unique identifier (GUID) by an operating system, or other program of the database. The GUID is used to uniquely identify that data item from among all other data items stored within the database 100.

The database 100 may include metadata defining objects which are mapped to logical entities of data store 110. The metadata may be stored in data store 110 and/or a separate repository (not shown). The metadata may include information regarding dimension names (e.g., country, year, product, etc.), dimension hierarchies (e.g., country, state, city, etc.), measure names (e.g., profit, units, sales, etc.) and any other suitable metadata. According to some embodiments, the metadata includes information associating users, queries, query patterns and visualizations. The information may be collected during operation of system and may be used to determine a visualization to present in response to a received query, and based on the query and the user from whom the query was received.

Each of clients 140 may include one or more devices executing program code of the applications 145 for presenting user interfaces to allow interaction with the server 130. The user interfaces of applications 145 may comprise user interfaces suited for reporting, data analysis, and/or any other functions based on the data of data store 110. Presentation of a user interface may include any degree or type of rendering, depending on the type of user interface code generated by the server 130. For example, a client 140 may execute a Web Browser to request and receive a Web page (e.g., in HTML, format) from the server 130 via HTTP, HTTPS, and/or Web Socket, and may render and present the Web page according to known protocols.

One or more of clients 140 may also or alternatively present user interfaces by executing a standalone executable file (e.g., an .exe file) or code (e.g., a JAVA applet) within a virtual machine. Clients 140 may execute applications 145 which perform merge operations of underlying data files stored in data store 110. Furthermore, clients 140 may execute the conflict resolution methods and processes described herein to resolve data conflicts between different versions of a data file stored in the data store 110. A user interface may be used to display underlying data records, and the like.

FIG. 2A illustrates a view within a display window that includes a table of records in accordance with example embodiments, FIG. 2B illustrates navigation routes within a software application including the view of the table of records in accordance with an example embodiment, and FIG. 2C illustrates a view of details of a data record from the table in the parent view of FIG. 2A that has been drilled-down into via a predefined navigation route of the software application in accordance with example embodiments.

Referring to FIG. 2A, a parent view 201 within a display window 200 includes a plurality of data records in tabular format. The display window 200 may be or be included in a user interface that is part of a software application that includes a plurality of views. As described herein, a view or a page may be a separate page of the application that can be loaded individually within the display window 200. The data records may be arranged in rows, where each row corresponds to a different data record. Furthermore, the attributes of the data records may be arranged in columns or fields where each column corresponds to a different data attribute. In FIG. 2A, the data records includes a plurality of columns 202, 204, 206, 208, and 210, corresponding to a plurality of data attributes, respectively. Each of the data records may have an option for selecting the date record to further drill down into the details of the data record. In this example, a user has selected data record 211 may placing a cursor over a row in the table corresponding to the data record 211.

FIG. 2B illustrates a plurality of hierarchical routes (page routes) that can be traversed via the software application. Here, each of the data records corresponds to a child view/page of the parent view 201 including the plurality of data records. For example, child views 220, 221, 222, 223, 224, and 225 include details of orders 7991, 7918, 7775, 7811, 8004, and 7858, respectively, and are dependent from the parent view 201. In other words, in order to get to the child views 220, 221, 222, 223, 224, and 225, the user must traverse through a route that includes the parent view 201. By selecting the data record 211 in FIG. 2A, a child view 221 (page) is displayed within the display window 200 as shown in FIG. 2C that includes details of the data record 211 (order 7918). For example, the child view 221 may include a window 240 with additional shipping details, customer details, payment details, previous orders, and the like. The display window 200 also provides a scroll bar 234 on a right-side of the display window which allows the user to move the view up and down.

It should be appreciated that the content within the views/pages is not limited to shipping data but any type of content. As further shown in FIG. 2B, if a user wants to traverse from the child view 221 of the order ID 7918 to the child view 223 of order ID 7811, the user must go back to the parent view 201 by pressing a back button 232 within the child view 221 and then drill-down into the child view 223 by selecting a corresponding data record from the table of records in the parent view 201. This process is inefficient.

According to various embodiments, a control menu may be generated and displayed within a child view (dependent page) that allows the user to traverse the view from a first child view to a second child view, without going back to the parent view (parent page). For example, referring again to FIG. 2B, a user may traverse from the child view 221 to any of the other child views (e.g., child views 220, 222, 223, 224, 225, etc.), by simply clicking on a data attribute value of any of the other child views that are displayed within the control menu, while viewing the child view 221. Thus, a user does not need to use the back button nor drill-down from the parent page into the other child view. Instead, the user can instantiate content from any of the other child views with a selection from the control menu.

FIGS. 3A-3J are diagrams illustrating various operations of a user interacting with a control menu in accordance with various example embodiments. In these examples, a user interface is shown which includes a display window 300 for displaying software content (e.g., pages of a software application, service, program, etc.) The user interface may be generated and displayed by a processing device (e.g., a processor) of a computing device such as a host platform, a user device, or the like. As an example, the display window 300 may be output to a locally-embedded or attached display, or it may be output to a remotely-connected device (e.g., via an Internet connection, etc.) between the host device and the display device. As one example, the host platform where the user interface is generated may be server, a cloud platform, a database, or the like, and the display device receiving the user interface may be a mobile device, desktop computer, laptop, tablet, or the like, which is connected to the host platform via the Internet.

Figure 3B:
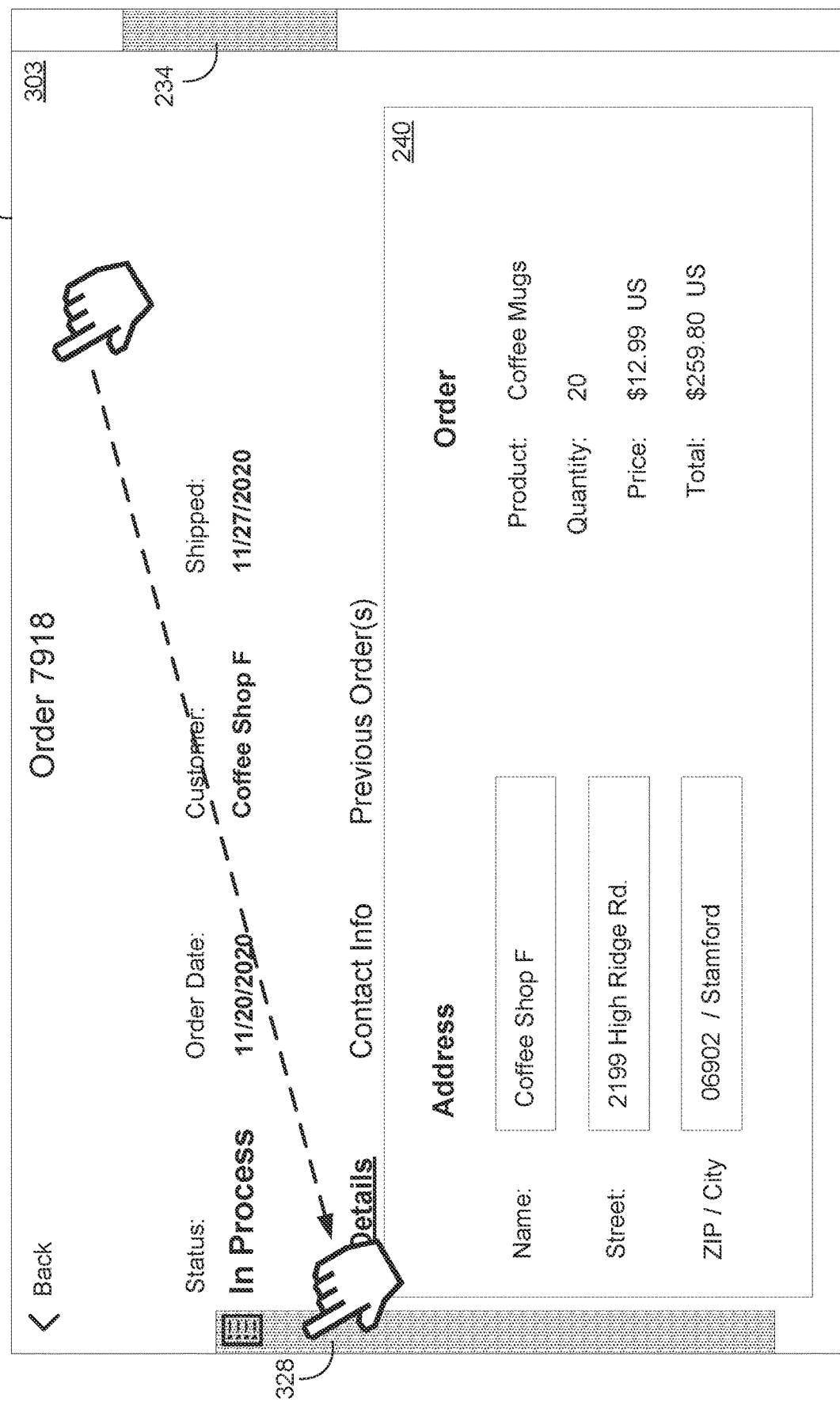
Figure 3E:
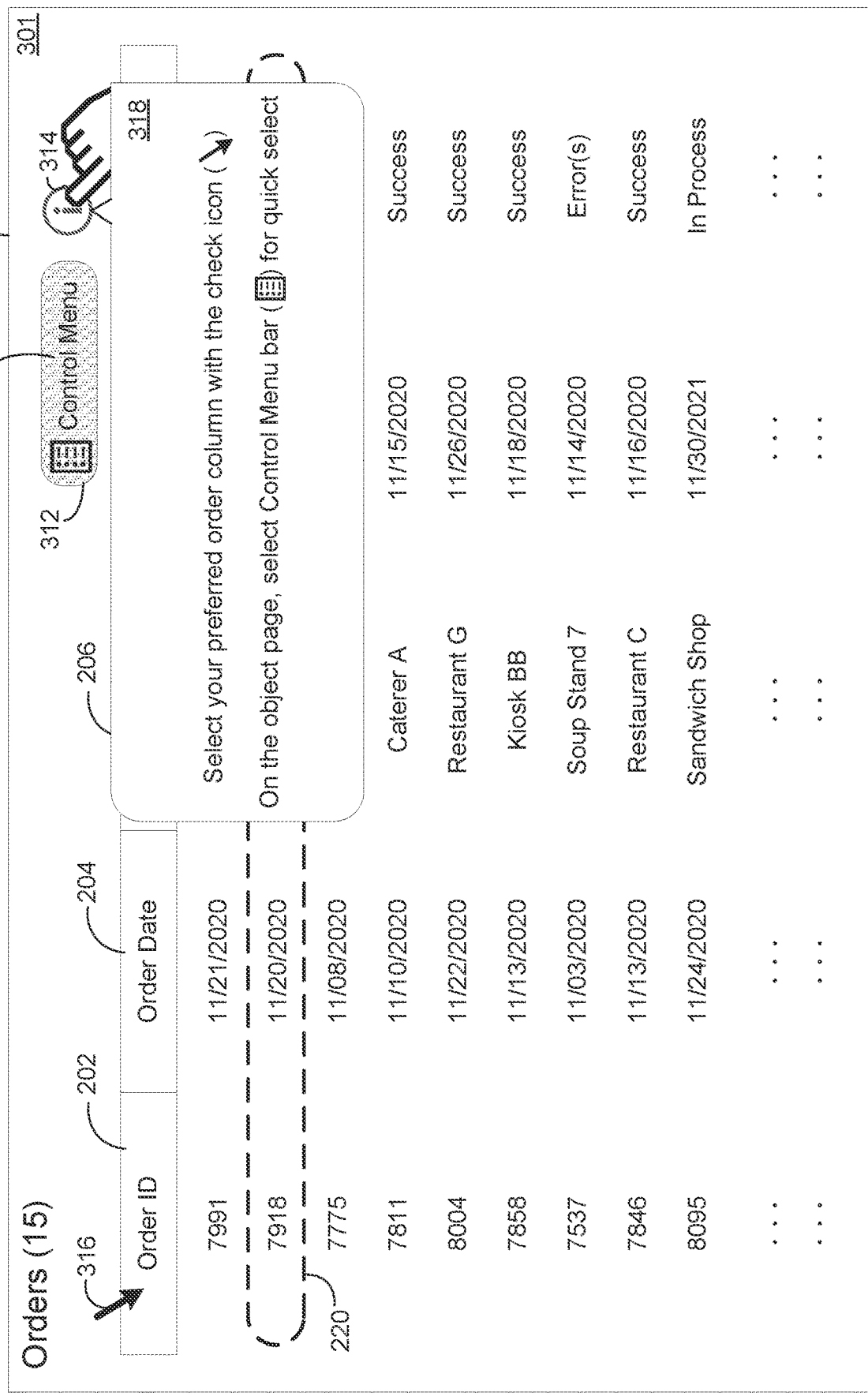

Referring to FIG. 3A, the display window 300 is instantiated with a parent view 301 which includes a table of data records including similar rows and columns as illustrated and described with respect to the example of FIG. 2A. However, in FIG. 3A, the parent view 301 includes a control menu activation button 312 that may be selected by a user (e.g., via a toggle input) using a mouse, finger, or other pointing device. When selected, the control menu activation button activates the control menu 320 according to various embodiments, and further described in the examples below. Once activated, content within the control menu activation button 312 may change color or shading to indicate that the control menu 320 is now active, such as shown in the example of FIG. 3E where a content area 313 of the control menu activation button 312 has darkened.

The parent view 301 also includes a target attribute selector 316 which can be used to select any of the columns 202, 204, 206, 208, and 210, (i.e., data attributes) as a target data attribute for populating the control menu 320. The parent view 301 also includes an information button 314 which provides a viewer/user with information about how to use the control menu 320. In the example of FIG. 3A, the user has moved a cursor to select the 'Order ID' data attribute (column 202) as the target data attribute for the control menu 320 by placing the target attribute selector 316 on a display of the data attribute 'Order ID' in the parent view 301. Next, the user drags the cursor to the control menu activation button 312 thereby activating the control menu 320 on a dependent child screen (not yet shown). When the user selects a data record 211, the display window 300 moves from the parent view 301 to a child view 303 as shown in FIG. 3B.

The child view 303 shown in FIG. 3B corresponds to the child view 221 that is shown in FIG. 2B. However, in this example, a selectable bar 328 corresponding to a control menu 320 (shown in FIG. 3C) is displayed an opposite side of the display window 300 with respect to a scroll bar 234 of the display window 300. It should be appreciated that a bar is just one example of a selectable item, and it should be appreciated that the selectable item does not need to be a bar but may be any kind of item, shape, icon, etc. It also can be positioned anywhere in the display window 300. In this example, the content inside of the control menu 320 may be launched or otherwise instantiated when the user brings the cursor within proximity or hovering over the selectable bar 328. In response, the software may display the control menu 320 as shown in the example of FIG. 3C.

Referring to FIG. 3C, the control menu 320 may slide outward from the selectable bar 328 thereby revealing the control menu content which may include selectable buttons including a target attribute switcher 321, a refresh button 322, and a settings button 323. Furthermore, a list of values of the selected target data attribute (i.e., selected using the target attribute selector 316 in the parent view 301 shown in FIG. 3A). In this example, the target data attribute is the Order ID attribute. Accordingly, values of the Order ID attribute for each of the data records is illustrated within a selectable area 324 of the control menu 320. The target data attribute may be selected as Order ID by default. However, the user can change which target data attribute is used in the selectable area 324 by moving the target attribute selector 316 in FIG. 3A, or by selecting the target attribute switcher 321 within the control menu 320. A box is displayed around a value 325 of the child view 303 that is currently selected.

According to various embodiments, the user may close or otherwise replace the child view 303 with any of the other child views by selecting a value of a target attribute of any of the other child views within the selectable area 324 of the control menu 320. For example, the user may simply click on a value or move the box to the value 325 via drag-and-drop. In the example of FIG. 3C, the user has selected a value 326 of a child view 306 that corresponds to a different data record with respect to the child view 303, within the parent view 301. Thus, the user can use the control menu 320 to navigate between different data records displayed within the parent view 301, without having to go back to the parent view 301. When the list of values of all data records from the parent view 301 cannot fit inside the selectable area 324, the control menu 320 may further include a scroll bar 327 for scrolling up/down to view additional values in the list.

In response to selecting the value 326, the application displays a child view 306 corresponding to the selected value 326, as shown in FIG. 3D. That is, the application updates the page content within the display window 300 to include a child view 306 corresponding to a different page that is dependent on the parent view 301 without requiring the user to traverse the display window 300 back to the parent view 301. Here, the control menu 320 may retract back into the selectable bar 328 thereby hiding the control menu 320 and enabling the viewer to see the underlying content in its entirety. However, in other examples, the control menu 320 may remain visible after the selection. Thus, a user can quickly traverse through different data records corresponding to different dependent pages of a parent page, without the need to go back to the parent page.

Returning now to the parent view 301 as shown in FIG. 3E, a user may also select the information button 314 to receiving a window 318 with additional help details regarding the control menu 320 and how to use it. Here, the window 318 includes instructions on how to use the target attribute selector 316 within the parent view 301, and instructions for how to open the control menu 320 within a child view.

Figure 3F:
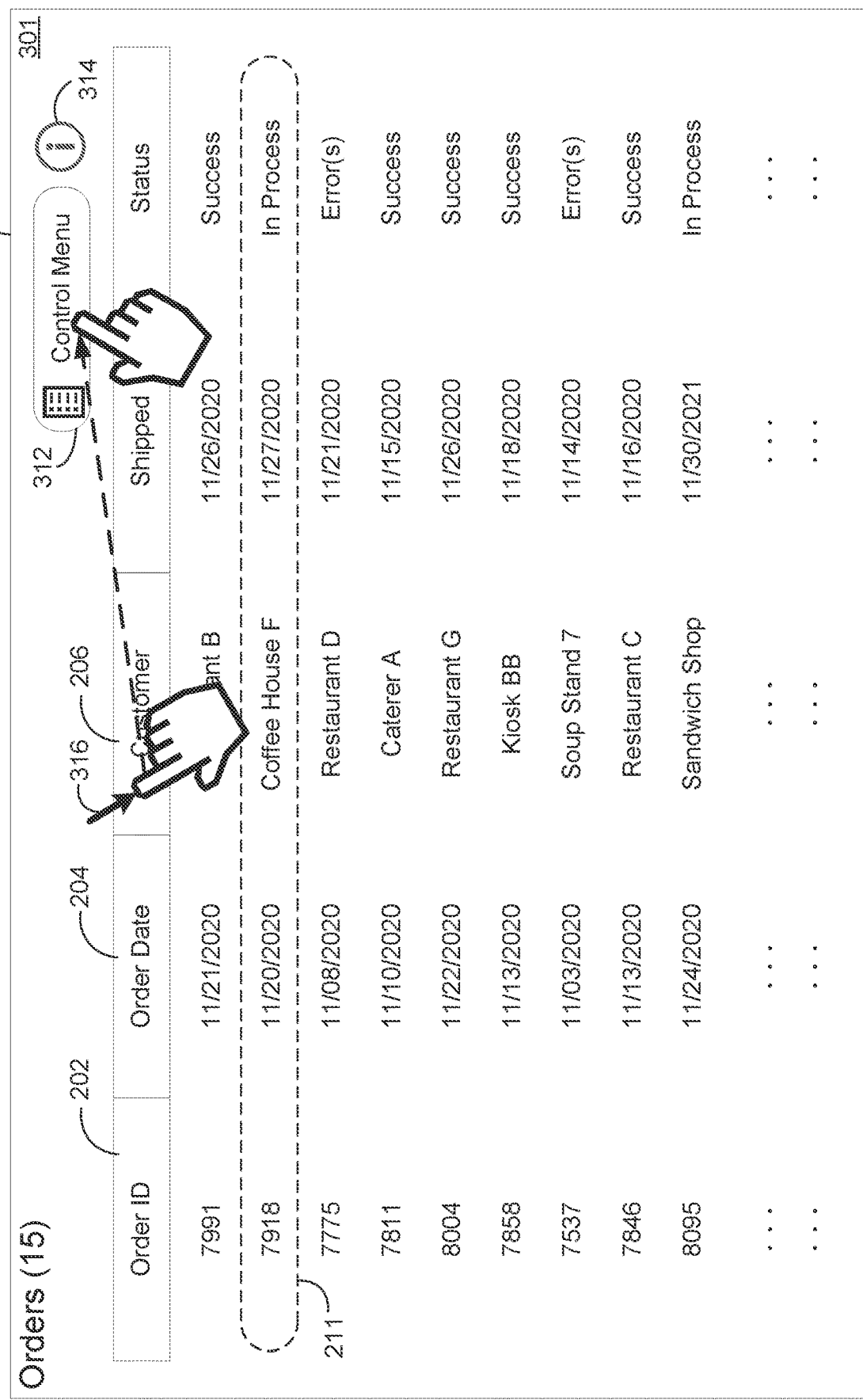
Figure 3G:
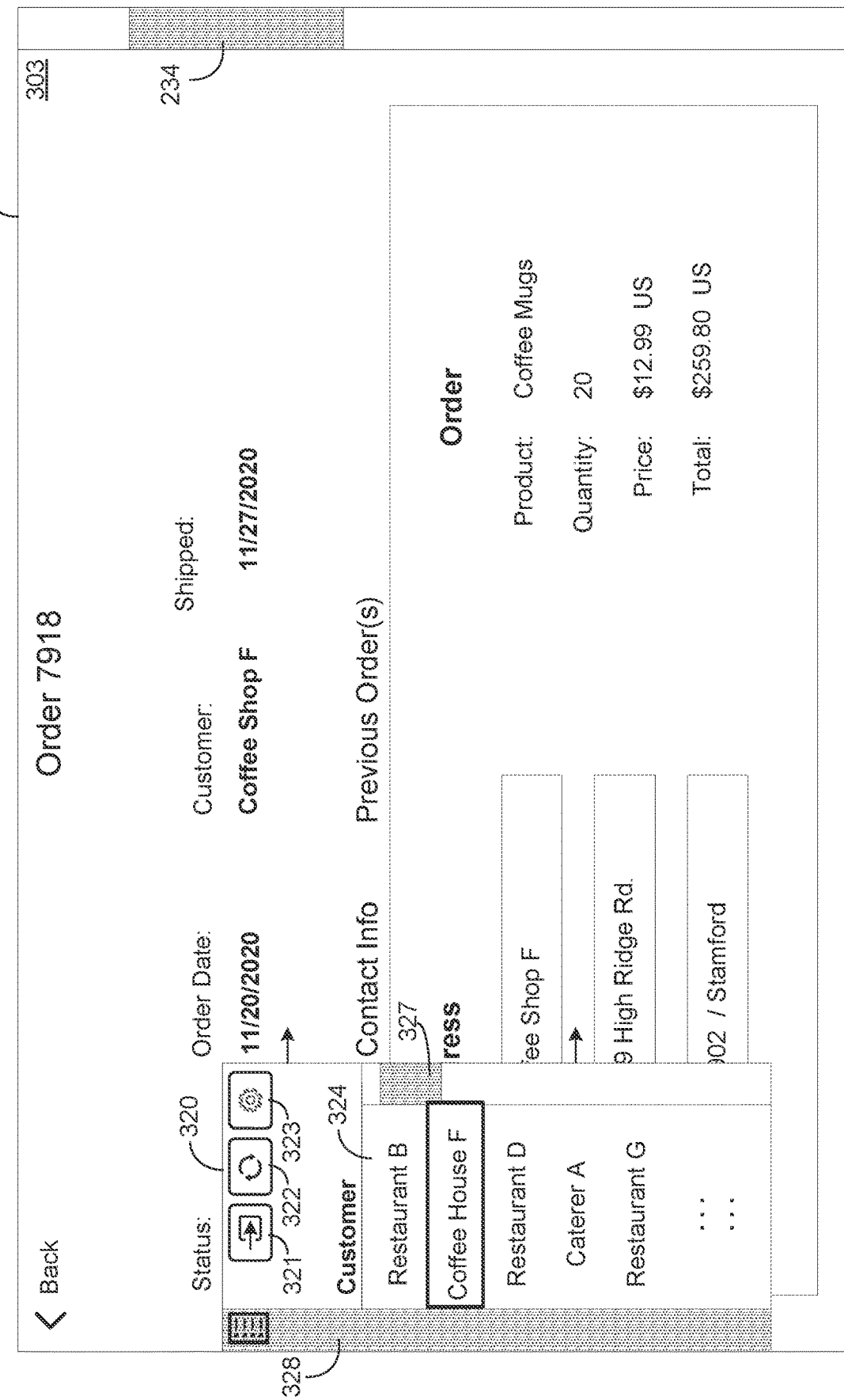

Referring to FIG. 3F, a user may move the target attribute selector 316 to select a different target data attribute for populating the control menu 320. Here, the user has moved the target attribute selector 316 from the Order ID attribute to a new attribute (i.e., Customer). When the user selects the control menu activation button 312 and then selects the data record 211, the child view 303 is shown in FIG. 3G. However, in this case, when the user places the cursor in proximity to the selectable bar 328, the selectable area 324 of the control menu 320 is populated with a different list of values of the data records corresponding to the newly selected target data attribute (Customer).

Figure 3I:
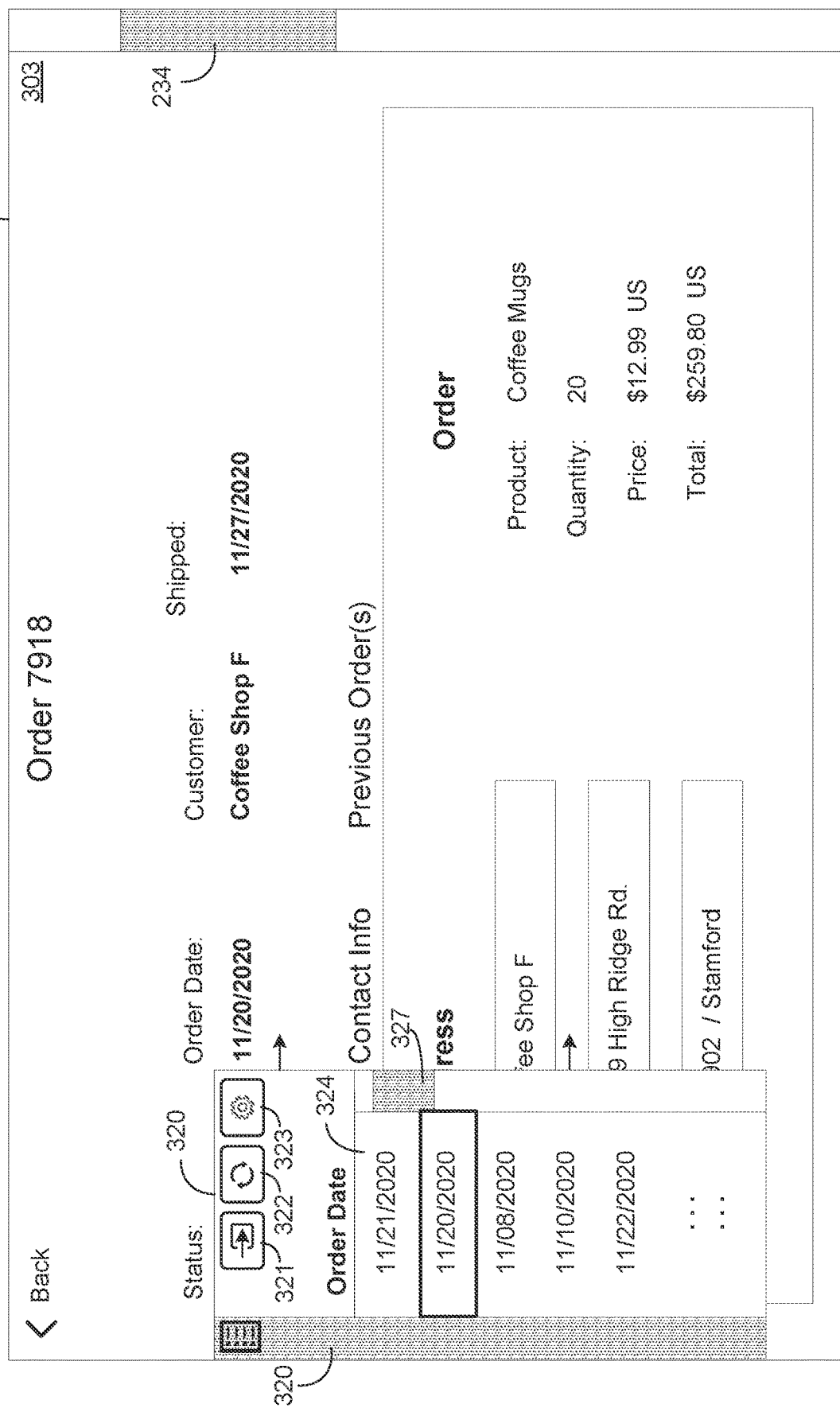

FIG. 3H illustrates another example of changing the target data attribute from the data records for populating the selectable area 324 of the control menu 320. In this example, the user can click on the target attribute switcher 321 within the control menu 320 for changing the target data attribute without having to go back to the parent view. Each click of the target attribute switcher 321 may move to a next data attribute (i.e., column) in the table shown in the parent view of the FIG. 3A. Thus, when the user selects the target attribute switcher 321 in FIG. 3H, the target data attribute may move to the Order Date attribute which is the next column in the table within the parent view. Thus, the selectable area 324 of the control menu 320 may be populated with a list of values from the data records of the newly selected target data attribute (i.e., Order Date) as shown in FIG. 3I. The user may repeatedly press the target attribute switcher 321 to move to a next attribute/column in the table. When the user reaches the end of the columns, the process may loop back to the first column/attribute.

In some embodiments, the control menu 320 may also include functionality for refreshing the entries within the control menu 320. This can be used, for example, if the user saves information within the child view 303 thereby causing the entries within the selectable area 324 of the control menu 320 to change. This includes attribute values that are not currently selected as the target attribute, but which can be.

FIG. 3J illustrates an example of modifying which columns (data attributes) of the data records that can be used for populating the selectable area 324 of the control menu 320. Here, the user can select the settings button 323 which opens a settings menu 350. The settings menu 350 includes identifiers of the data attributes (columns) of the data records within the table in the parent view 301. Here, the user can select which attributes are capable of being used to populate the selectable area 324 of the control menu 320. That is, the user can disable/enable which attributes are capable of being selected. Here, the user may uncheck a checkbox of an attribute identifier 352 corresponding to "Customer". When the user goes to switch the target data attribute (e.g., via the target attribute switcher 321), the system will skip over the Customer attribute and not allow that attribute to be used. This can be very helpful for situations where many columns of data attributes (e.g., 15 or more) are shown because the user can limit the available target data attributes to a small subset of attributes (e.g., 3-5, etc.). Also, the text content within the selectable area 324 of the control menu 320 may be too wide to fit inside the selectable area 324 and may be partially cut off. To address this, the user may also change a width of the selectable area 324 using a text box 354.

FIG. 4 illustrates a method 400 of controlling navigation via a keyboard navigation menu in accordance with an example embodiment. For example, the method 400 may be performed by a software program running on a database node, a cloud platform, a server, a computing system (user device), a combination of devices/nodes, or the like. Referring to FIG. 4, in 410 the method may include navigating a display window from a parent view of a plurality of data records to a child view that includes drilled-down details of a first data record of the plurality of data records in response to selection of the first data record via the parent view. Here, the child view may be an application page, webpage, etc., which depends from a page that includes the parent view within the framework of a software application. In this case, in order to get to the child view a user must navigate a page route through the parent view. Therefore, the page hierarchy in the application may only allow access to the child view from the page of the parent view within the software application.

In 420, the method may include displaying a control menu within the child view which comprises a plurality of values of a target data attribute for the plurality of data records, respectively. In 430, the method may include detecting, via the control menu, a selection of a value of a target data attribute of a second data record from among the plurality of values of the target data attribute for the plurality of data records. In 440, the method may include removing the drilled-down details of the first data record and instantiating drilled-down details of the second data record within the child view, in response to the selection.

In some embodiments, displaying the control menu may include embedding a selectable item corresponding to the control menu within a vertical bar on an opposite side of the display window with respect to a vertical scroll bar of the display window. In some embodiments, displaying the control menu may further include detecting a pointer hovering over the selectable item, and in response, display the control menu in association with the selectable item. In some embodiments, the method may further include detecting a command via the parent view which sets the target data attribute from among the plurality of data attributes prior to navigating from the parent view to the child view.

In some embodiments, the method may further include detecting a selection of an attribute switcher displayed within the control menu, and in response, removing the plurality of values of the target data attribute for the plurality of data records within the control menu and displaying a plurality of values of an adjacent data attribute within the parent view for the plurality of data records within the control menu. In some embodiments, the method may further include activating a display of the control menu within the child view in response to detecting a selection of an activation button displayed within the parent view.

In some embodiments, the displaying the child view may include removing a first page including a two-dimensional table with the plurality of data records therein from the display window and navigating to a second page including the drilled-down details of the first data record. In some embodiments, the method may further include detecting a selection of a settings button via the control menu, and in response, displaying a list of identifiers of the plurality of data attributes and options for modifying which of the plurality of data attributes can be selected as the target data attribute for the control menu.

Figure 5:
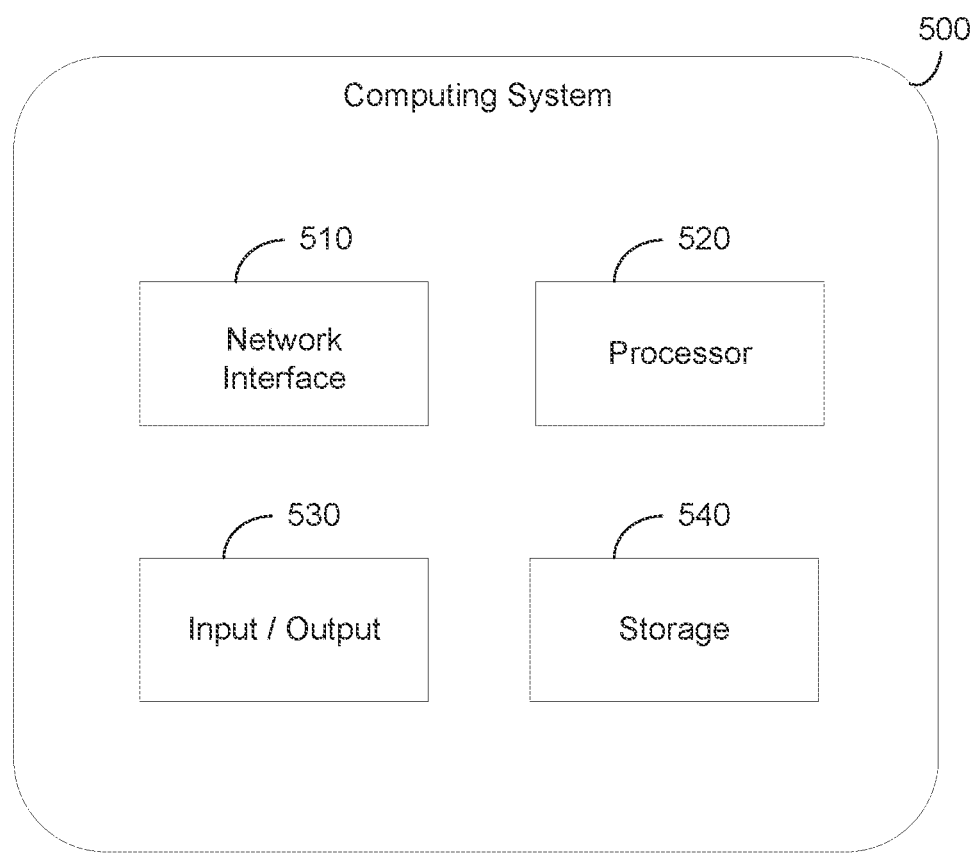
FIG. 5 is a diagram illustrating a computing system for use in the examples herein in accordance with an example embodiment.

FIG. 5 illustrates a computing system 500 that may be used in any of the methods and processes described herein, in accordance with an example embodiment. For example, the computing system 500 may be a database node, a server, a cloud platform, or the like. In some embodiments, the computing system 500 may be distributed across multiple computing devices such as multiple database nodes.

Referring to FIG. 5, the computing system 500 includes a network interface 510, a processor 520, an input/output 530, and a storage 540 such as an in-memory storage, and the like. Although not shown in FIG. 5, the computing system 500 may also include or be electronically connected to other components such as a microphone, a display, an input unit(s), a receiver, a transmitter, a persistent disk, and the like. The processor 520 may control or replace any of the other components of the computing system 500.

According to various embodiments, the processor 520 may output a user interface to a local display or to a display of a remotely-connected device (e.g., via the network interface 510), which includes a control menu as described in the example embodiments. The processor 520 may perform any of the method steps described with respect to FIG. 4, and the operations that are described in the examples of FIGS. 1, 2A, 2B, and 3A-3J.

The network interface 510 may transmit and receive data over a network such as the Internet, a private network, a public network, an enterprise network, and the like. The network interface 510 may be a wireless radio interface, a wired interface such as a network card, a satellite communication interface, or a combination thereof. The processor 520 may include one or more processing devices each including one or more processing cores. In some examples, the processor 520 is a multicore processor or a plurality of multicore processors. Also, the processor 520 may be fixed or it may be reconfigurable. The input/output 530 may include an interface, a port, a cable, a bus, a board, a wire, and the like, for inputting and outputting data to and from the computing system 500. For example, data may be output to an embedded display of the computing system 500, an externally connected display, a display connected to the cloud, another device, and the like. The network interface 510, the input/output 530, the storage 540, or a combination thereof, may interact with applications executing on other devices.

The storage 540 is not limited to a particular storage device and may include any known memory device such as RAM, ROM, hard disk, and the like, and may or may not be included within a database system, a cloud environment, a web server, or the like. The storage 540 may store software modules or other non-transitory instructions which can be executed by the processor 520 to perform the methods and processes described herein. The storage 540 may include a data store having a plurality of tables, partitions and sub-partitions. The storage 540 may be used to store database records, items, entries, and the like. Also, the storage 540 may be queried using SQL commands.

As will be appreciated based on the foregoing specification, the above-described examples of the disclosure may be implemented using computer programming or engineering techniques including computer software, firmware, hardware or any combination or subset thereof. Any such resulting program, having computer-readable code, may be embodied or provided within one or more non-transitory computer-readable media, thereby making a computer program product, i.e., an article of manufacture, according to the discussed examples of the disclosure. For example, the non-transitory computer-readable media may be, but is not limited to, a fixed drive, diskette, optical disk, magnetic tape, flash memory, external drive, semiconductor memory such as read-only memory (ROM), random-access memory (RAM), and/or any other non-transitory transmitting and/or receiving medium such as the Internet, cloud storage, the Internet of Things (IoT), or other communication network or link. The article of manufacture containing the computer code may be made and/or used by executing the code directly from one medium, by copying the code from one medium to another medium, or by transmitting the code over a network.

The computer programs (also referred to as programs, software, software applications, "apps", or code) may include machine instructions for a programmable processor, and may be implemented in a high-level procedural and/or object-oriented programming language, and/or in assembly/machine language. As used herein, the terms "machine-readable medium" and "computer-readable medium" refer to any computer program product, apparatus, cloud storage, internet of things, and/or device (e.g., magnetic discs, optical disks, memory, programmable logic devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal that may be used to provide machine instructions and/or any other kind of data to a programmable processor.

The above descriptions and illustrations of processes herein should not be considered to imply a fixed order for performing the process steps. Rather, the process steps may be performed in any order that is practicable, including simultaneous performance of at least some steps. Although the disclosure has been described in connection with specific examples, it should be understood that various changes, substitutions, and alterations apparent to those skilled in the art can be made to the disclosed embodiments without departing from the spirit and scope of the disclosure as set forth in the appended claims.

What is claimed is:

1. A computing system comprising:
a processor configured to
navigate a display window from a parent view of a plurality of data records to a child view that includes drilled-down details of a first data record of the plurality of data records in response to selection of the first data record via the parent view,
display a control menu within the child view which comprises a plurality of values of a target data attribute for the plurality of data records, respectively, and display a selectable bar corresponding to the control menu on an opposite side of the display window with respect to a scroll bar of the display window,
detect, via the control menu, a selection of a value of a target data attribute of a second data record from among the plurality of values of the target data attribute for the plurality of data records, and
remove the drilled-down details of the first data record and instantiate drilled-down details of the second data record within the child view, in response to the selection.

2. The computing system of claim 1, wherein the processor is configured to detect a pointer hovering over the selectable bar, and in response, display the control menu including the plurality of values of the target data attribute.

3. The computing system of claim 1, wherein the processor is further configured to detect a command via the parent view which sets the target data attribute from among the plurality of data attributes prior to navigating from the parent view to the child view.

4. The computing system of claim 1, wherein the processor is further configured to detect a selection of an attribute switcher button displayed within the control menu, and in response, remove the plurality of values of the target data attribute for the plurality of data records within the control menu and display a plurality of values of an adjacent data attribute within the parent view for the plurality of data records within the control menu.

5. The computing system of claim 1, wherein the processor is further configured to activate a display of the control menu within the child view in response to detection of a selection of an activation button displayed within the parent view.

6. The computing system of claim 1, wherein the processor is configured to remove a first page including a two-dimensional table with the plurality of data records therein from the display window and navigate to a second page including the drilled-down details of the first data record.

7. The computing system of claim 1, wherein the processor is further configured to detect a selection of a settings button via the control menu, and in response, display a list of identifiers of the plurality of data attributes and options for modifying which of the plurality of data attributes can be selected as the target data attribute for the control menu.

8. A method comprising:
navigating a display window from a parent view of a plurality of data records to a child view that includes drilled-down details of a first data record of the plurality of data records in response to selection of the first data record via the parent view;
displaying a control menu within the child view which comprises a plurality of values of a target data attribute for the plurality of data records, respectively, and displaying a selectable bar corresponding to the control menu on an opposite side of the display window with respect to a scroll bar of the display window;
detecting, via the control menu, a selection of a value of a target data attribute of a second data record from among the plurality of values of the target data attribute for the plurality of data records; and
removing the drilled-down details of the first data record and instantiating drilled-down details of the second data record within the child view, in response to the selection.

9. The method of claim 8, wherein the displaying the control menu further comprises detecting a pointer hovering over the selectable bar, and in response, displaying the control menu including the plurality of values of the target data attribute.

10. The method of claim 8, wherein the method further comprises detecting a command via the parent view which sets the target data attribute from among the plurality of data attributes prior to navigating from the parent view to the child view.

11. The method of claim 8, further comprising detecting a selection of an attribute switcher displayed within the control menu, and in response, removing the plurality of values of the target data attribute for the plurality of data records within the control menu and displaying a plurality of values of an adjacent data attribute within the parent view for the plurality of data records within the control menu.

12. The method of claim 8, wherein the method further comprises activating a display of the control menu within the child view in response to detecting a selection of an activation button displayed within the parent view.

13. The method of claim 8, wherein the displaying the child view comprises removing a first page including a two-dimensional table with the plurality of data records therein from the display window and navigating to a second page including the drilled-down details of the first data record.

14. The method of claim 9, wherein the method further comprises detecting a selection of a settings button via the control menu, and in response, displaying a list of identifiers of the plurality of data attributes and options for modifying which of the plurality of data attributes can be selected as the target data attribute for the control menu.

15. A method comprising:
navigating a display window from a first view of a plurality of data records to a second view that includes details of a data record of the plurality of data records in response to selection of the data record via the first view;
displaying a control menu with the second view that includes the details of the data record, and displaying a selectable bar corresponding to the control menu on an opposite side of the display window with respect to a scroll bar of the display window, where the control menu comprises a plurality of selectable values corresponding to the plurality of data records, respectively;
detecting, via the control menu, a selection of a value of a different data record from among the plurality of selectable values within the control menu; and
replacing the details of the data record with details of the different data record within the second view, in response to the selection.

16. The method of claim 15, wherein the displaying the control menu further comprises detecting a pointer hovering over the selectable bar, and in response, displaying the control menu including the plurality of selectable values.

17. The method of claim 15, wherein the method further comprises activating a display of the control menu within the second view in response to detecting a selection of an activation button displayed within the first view.

* * * * *